(12) United States Patent
Bosch et al.

(10) Patent No.: US 6,360,818 B1
(45) Date of Patent: Mar. 26, 2002

(54) BAFFLE FOR A HEADER IN A HEAT EXCHANGER

(75) Inventors: Daniel J. Bosch, Racine; Hal W. Cousins, Sturtevant; Ed L. Hendricks; Donald R. Johnson, both of Racine; Thomas F. Mitchell, Waterford, all of WI (US)

(73) Assignee: Modine Manufacturing Co., Racine, WI (US)

( * ) Notice: Subject to any disclaimer, the term of this patent is extended or adjusted under 35 U.S.C. 154(b) by 798 days.

(21) Appl. No.: 08/938,779

(22) Filed: Sep. 26, 1997

Related U.S. Application Data

(62) Division of application No. 08/503,989, filed on Jul. 19, 1995, now Pat. No. 5,799,396.

(51) Int. Cl.⁷ .................................................. F28F 9/22
(52) U.S. Cl. ...................... 165/174; 138/89; 29/890.052
(58) Field of Search ........................... 220/305; 138/89; 428/66.3; 165/174; 29/890.052

(56) References Cited

U.S. PATENT DOCUMENTS

| | | | |
|---|---|---|---|
| 3,269,582 A | * 8/1966 | Knocke | 220/305 |
| 3,467,271 A | * 9/1969 | Kaiser et al. | 138/89 |
| 3,909,920 A | 10/1975 | Cornish et al. | |
| 4,462,430 A | * 7/1984 | Anthony et al. | 138/89 |
| 4,546,825 A | 10/1985 | Melnyk et al. | |
| 4,762,152 A | * 8/1988 | Clausen | 138/89 |
| 4,844,152 A | * 7/1989 | Hummert | 165/76 |
| 5,016,674 A | 5/1991 | Kiss | |
| 5,067,235 A | 11/1991 | Kato et al. | |
| 5,118,079 A | 6/1992 | Watts | |
| 5,121,537 A | 6/1992 | Matsui et al. | |
| 5,207,247 A | 5/1993 | Hood | |
| 5,209,292 A | 5/1993 | Arneson et al. | |
| 5,226,490 A | 7/1993 | Ryan et al. | |
| 5,233,756 A | 8/1993 | le Gauyer | |
| 5,450,667 A | 9/1995 | Gire | |

FOREIGN PATENT DOCUMENTS

| | | |
|---|---|---|
| EP | 0521489 A1 | 1/1993 |
| FR | 2676535 | 11/1992 |

* cited by examiner

*Primary Examiner*—Allen Flanigan
(74) *Attorney, Agent, or Firm*—Wood, Phillips, VanSanten, Clark & Mortimer

(57) ABSTRACT

A method of installing a baffle (46) in a tubular header (10), (12) for a heat exchanger includes the steps of a) providing a concavo-convex baffle (60) with a periphery smaller than the internal periphery of the header (10), (12); b) locating the baffle (60) at a desired location within the header (10), (12); and c) applying a compressive force (102), (110) to the baffle (60) to compress the baffle toward a planar shape.

4 Claims, 4 Drawing Sheets

BAFFLE FOR A HEADER IN A HEAT EXCHANGER

This is a division of application Ser. No. 08/503,989 filed Jul. 19, 1995, now U.S. Pat. No. 5,799,396.

FIELD OF THE INVENTION

This invention relates to heat exchangers, and more particularly, to baffles employed in heat exchangers.

BACKGROUND OF THE INVENTION

Recent years have seen an explosion in the popularity of so-called "parallel flow" heat exchangers. One typical construction is illustrated in U.S. Pat. No. 4,688,311 issued Aug. 25, 1987 to Saperstein, et al.

Heat exchangers of this sort have been employed in a variety of applications including condensers and evaporators in air conditioning and refrigerating systems and in oil coolers which are employed to cool lubricating oil or hydraulic fluid, particularly in vehicular applications. Indeed, there is suggestion in the prior art that parallel flow heat exchangers even be employed as radiators for cooling engine coolant in vehicles.

Modern day parallel flow heat exchangers are typically made of aluminum and employ two spaced tubular headers. Flattened tubes extend between and are in fluid communication with the interiors of the headers. Serpentine fins are located between the flattened tubes.

Conventionally, aluminum is the material of choice and the result is a compact, lightweight heat exchanger which operates with exceptional efficiency particularly when the hydraulic diameter of the fluid passageways within the flattened tubes is 0.070" or less.

In many applications, it is desired that the fluid contained within the heat exchanger make more than one pass through the heat exchanger across the cooling air path in which the heat exchanger is disposed. To achieve this, it is conventional to locate one or more baffles in one or both of the headers to achieve as many passes as is desired.

Typically, the baffles have been plate-like inserts that are disposed in slits in the headers. To seal the slits as well as the point of contact of the baffle with the interior of the header, when the materials employed are aluminum reliance is made on the flow of braze alloy to seal any voids. The use of slits in the headers may tend to weaken the headers and, in some instances, may result in a significant number of leaky headers being formed as a result of fluid pressure within the headers that result from the application of heat to the heat exchanger during the brazing process.

In other cases, cap-like baffles have been inserted endwise into the headers to the desired location and then brazed in place. While such baffles usually are quite leak free, this method of installation does not lend itself to use with a header whose interior cross section may vary.

U.S. Pat. No. 4,615,385 issued Oct. 7, 1986 to Saperstein, et al., there is disclosed a unique header for heat exchangers of this type. To provide improved strength in the resulting heat exchanger, each header is formed of a generally cylindrical tube with a series of tube slots formed in one side thereof. Between each tube slot, a dome is formed, which dome is in the shape of a compound curve. Because of the use of the domes between adjacent tube slots, stresses at the tube to header joints in the resulting heat exchangers are considerably reduced and a much stronger heat exchanger results.

However, because of the use of the domes, the cross section of the header is relatively large where each dome is formed and is relatively smaller where each tube slot is formed. As a consequence, it has heretofore been impossible to provide such headers with baffles that are inserted endwise into the headers.

The present invention is directed to overcoming one or more of the above problems.

SUMMARY OF THE INVENTION

It is the principal object of the invention to provide a new and improved method of providing a header with an interior baffle. More specifically, it is an object of the invention to provide a new and improved method of installing a baffle in a tubular header.

It is also an object of the invention to provide a heat exchanger that includes a header provided with a baffle in accordance with the process or method of the invention.

Still another object of the invention is to provide a novel baffle preform that may be used in practicing the method of the invention.

An exemplary embodiment of a method of installing a baffle in a tubular header for a heat exchanger includes the steps of: (a) providing a baffle with a concave side periphery smaller than the internal periphery of the header; (b) locating the baffle at a desired location within the header; and (c) applying a compressive force to the baffle to compress the baffle toward a planar shape.

As a result of the foregoing, the baffle expands peripherally within the header to engage the interior of the header whereat it may be secured and sealed as, for example, but not necessarily, by brazing.

In one embodiment of the method, the baffle is concavo-convex has a generally circular periphery and includes a generally central convex dome surrounded by a peripheral, radially outward directed skirt.

In a highly preferred embodiment of the invention, both the header and the baffle are aluminum and the baffle is braze clad on both sides thereof.

In one embodiment of the invention, step (b) is performed by placing the header over a spindle and abutting it against a stop and then placing the baffle within the header in abutment with the spindle.

In one embodiment of the invention, step (c) is performed by placing a second spindle within the header after the performance of step (b) and moving the second spindle against the baffle and towards the first-named spindle.

In one embodiment of the invention, step (b) is preceded by the step of sizing the interior of the header at the desired location of the baffle.

Preferably, the step of sizing is performed by locating an expandable mandrel within the header at the desired location and expanding the mandrel into the header at the desired location.

In a highly preferred embodiment of the invention, the expandable mandrel is a split mandrel and the step of expanding the expandable mandrel is performed by moving a wedge into the split mandrel.

In one embodiment of the invention, there is provided a heat exchanger that includes a header with a baffle therein and which is made according to the process described above.

According to another facet of the invention, a baffle preform is provided for use in the manufacture of a heat exchanger with a baffled, tubular header. The baffle preform comprises a metallic slug having a convex side and an opposite concave side. The slug is circular and has a generally semi-spherical dome of smaller diameter than the slug on one side thereof and a radially outward directed skirt extending from the base of the dome to the periphery of the slug.

Preferably, the skirt is frustoconical.

In a highly preferred embodiment, the minor base of the skirt merges into the base of the dome and the skirt also extends axially away from the dome.

Preferably, the slug is formed of aluminum sheet and is braze clad on both sides thereof.

The invention also contemplates a method of making a heat exchanger header with an internal baffle which comprises the steps of (a) providing a tubular header of generally cylindrical shape and having a series of tube receiving slots at one side thereof which are separated by domes shaped as compound curves, the cross section of the header being relatively larger at the domes and relatively smaller at the tube slots; (b) providing a concave baffle of a generally circular periphery, and of a diameter sufficiently small so as to be received in the header and located therein generally transverse thereto at the relatively larger cross section and of a diameter larger than the relatively small cross section; (c) locating the baffle within the header at a desired one of the domes; (d) causing the baffle to be generally transverse to the header; and (e) collapsing the baffle to a generally planar configuration at the desired one of the domes.

Preferably, step (e) is performed by relatively moving mandrels on opposite sides of the baffle towards each other.

Preferably, step (b) is performed by providing a baffle of sheet-like material having a dome surrounded by a generally radially outward directed skirt.

In this embodiment, the dome is generally semispherical and preferably, the skirt is generally frustoconical.

Other objects and advantages will become apparent from the following specification taken in connection with the accompanying drawings.

DESCRIPTION OF THE PREFERRED EMBODIMENT

Figure 1:
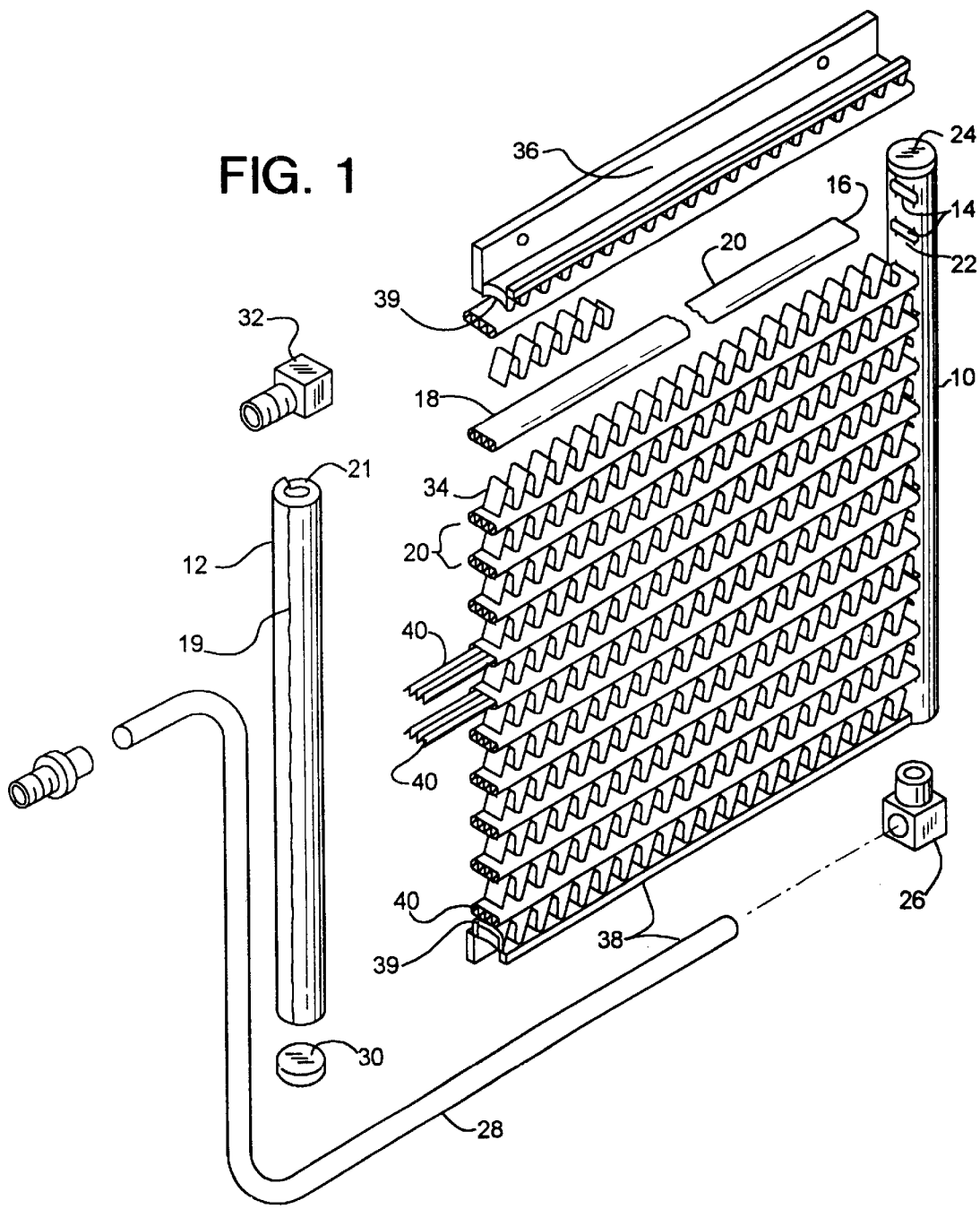
FIG. 1 is a partially exploded view of a heat exchanger, specifically, a condenser, made according to the invention, that may embody a header with an internal baffle made according to the invention.

An exemplary embodiment of the invention is illustrated in the drawings in connection with a heat exchanger that will be recognized to be a condenser by those skilled in the art. However, it is to be expressly understood that the invention's applicability extends beyond condensers and may be employed in any type of heat exchanger utilizing tubular headers, including but not limited to, evaporators and oil coolers.

Referring to FIG. 1, a parallel flow condenser with which the invention may be used is seen to include spaced, generally parallel headers 10 and 12. The headers 10 and 12 are preferably made up from generally cylindrical tubing. On their facing sides, they are provided with a series of generally parallel slots or openings 14 for the receipt of corresponding ends 16 and 18 of flattened condenser tubes 20. The header tubes 10 and 12 are preferably welded and thus include a weld seam as shown at 19 in connection with the header tube 12.

The slots 14 are punched on the facing sides of the headers 10 and 12. The slots 14 are, of course, elongated and their direction of elongation is transverse to the direction of elongation of the headers 10 and 12.

Preferably, between the slots 14, in the area shown at 22, each of the headers 10 and 12 is provided with a somewhat spherical dome to improve resistance to pressure as is more fully described in commonly assigned U.S. Pat. No. 4,615,385 mentioned previously.

The header 10 has one end closed by a cap 24 brazed or welded thereto. In the preferred embodiment of the invention, the various components are all formed of aluminum and are all brazed together and accordingly, in the usual case, brazing will be the means employed to fasten the cap 24 to the header 10. Similarly, fittings such as the fitting 26 are brazed to other components and a tube 28 may be connected to the fitting 26 to define an outlet for the condenser.

The lower end of the header 12 is closed by a cap 30, preferably brazed in place similarly to the cap 24, while the upper end of the welder 12 is provided with a welded or brazed in place fitting 32. Typically, the fitting 32 will serve as an inlet although flow direction may be reversed in some instances.

A plurality of the tubes 20 extend between the headers 10 and 12 and are in fluid communication therewith. The tubes are geometrically in parallel with each other and hydraulically in parallel as well. Disposed between adjacent ones of the tubes 20 are serpentine fins 34 although plate fins could be used if desired. Upper and lower side channels 36 and 38 extend between the headers 10 and 12 to provide rigidity to the system. Each end of each of the channels 36 and 38 include an outturned flange 39 of which is adapted to be bonded to the adjacent header 10 or 12.

As can be seen in FIG. 1, each of the tube 20 is a flattened tube and within its interior includes an undulating spacer or insert of elongate construction. In cross-section, the insert appears as more fully disclosed in previously identified U.S. Pat. No. 4,688,311. However, it should be understood that multi-passage, extruded tubes may be used as well.

Those skilled in the art will appreciated from the foregoing description that a single pass parallel flow heat exchanger has been described. As noted previously, however, in some instances, it is desirable that there be multiple passes. In such a case, one or more baffles are placed in one or the other or both of the header tubes 10 and 12.

Figure 2:
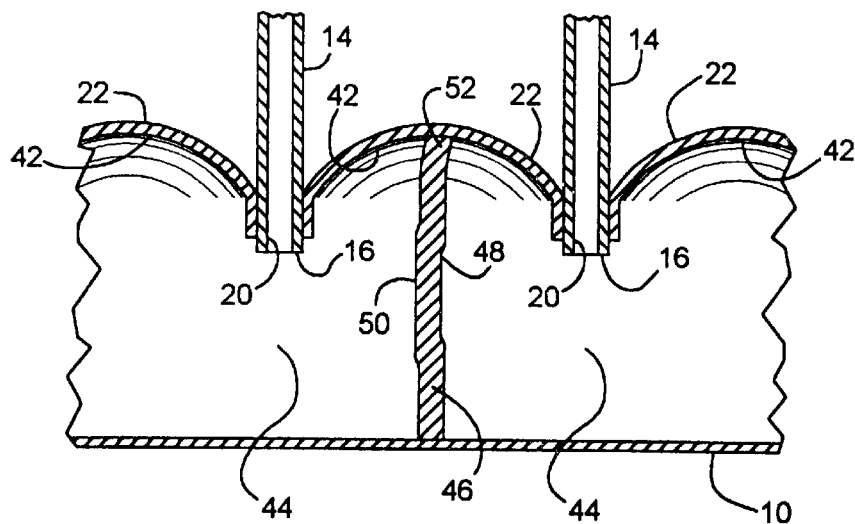
FIG. 2 is an enlarged, fragmentary, sectional view of a header with a baffle installed therein and made according to the invention.

Turning to FIG. 2, the header 10 is illustrated although it should be understood that what is there illustrated is equally applicable to the header 12.

More specifically, the tube slots 20 are illustrated as receiving the ends 16 of the tubes 14. The domes 22 between each of the flattened tubes 14 are illustrated and it will be appreciated that in a section taken parallel to the direction of elongation of the header 10, the domes 22 are curved.

It will be appreciated that because the headers 10 are generally cylindrical, the domes 22 will also have a curved appearance in a section taken through anyone of the domes 22 transverse to the header 10. Thus, the domes 22 are formed of compound curves and as can be seen in FIG. 2, this results in the header having a relatively larger cross-section 42 at each of the domes 22 and a relatively smaller cross-section 44 at each of the tube slots 20.

It will also be appreciated that since the tube slots 20 and the domes 22 are located on only one side of each header, that at least a part of the header will retain an interior cylindrical shape over an arc length in excess of 180°.

A baffle 46 is disposed within the header 10 at a desired location at the center of a desired one of the domes 22 and is oriented so as to be transverse to the direction of elongation of the header 10. The same is brazed in place during the assembly of the heat exchanger.

As illustrated in FIG. 2, the baffle 46 is generally planar although the same will typically have a small shallow recess 48 on one side thereof and a relatively larger, shallow raised area 50 oppositely of the shallow recess 48. In many instances, adjacent the dome 22, the baffle 46 will have a slight angular offset as shown at 52.

Figure 3:
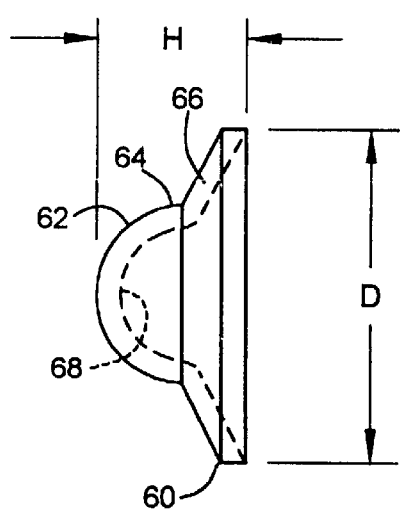
FIG. 3 is a side elevation of a baffle preform used in the invention.
Figure 4:
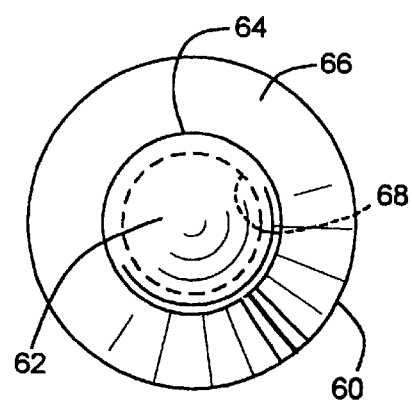
FIG. 4 is a plan view of the baffle preform.

The baffle 46 is formed of a preform such as that illustrated in FIGS. 3 and 4. The preform is basically a circular slug 60 having a semispherical dome 62 at one side thereof. The base 64 of the dome 62 merges with the minor base of a frustoconical skirt 66. The arrangement is such that the preform slug 60 is convex on its left side as illustrated in FIG. 3 and concave on its right side, i.e., concavo-convex.

The slug 60 may be formed by taking a circular piece of sheet aluminum braze clad on both sides, and pressing the same down on a ball bearing whose diameter is equal to that of the semi-spherical dome 62 on the interior surface 68 thereof.

The height of the slug is designated "H" as seen in FIG. 3 while the diameter is shown as "D", also in FIG. 3. In general, the ratio of "D" to "H" will be 2:1 or greater.

The following table illustrates parameters that may be used in forming baffles for use in standard aluminum tubing employed as headers in heat exchangers. One material that may be used in making the baffles is Number 12 braze sheet 0.062" thick 3003–0 aluminum sheet clad with 4343 on both sides. All dimensions are given in inches unless otherwise indicated.

|    | HEADER SIZE | BAFFLE DIAMETER (D) | BALL FORMING DIAMETER | DOME HEIGHT (H) |
| --- | --- | --- | --- | --- |
| 1. | .688 | .562 | .250 | .222 |
| 2. | .875 | .750 | .312 | .290 |
| 3. | 25 mm | .875 | .375 | .318 |
| 4. | 1.25 | 1.125 | .500 | .325 |

Figure 5:
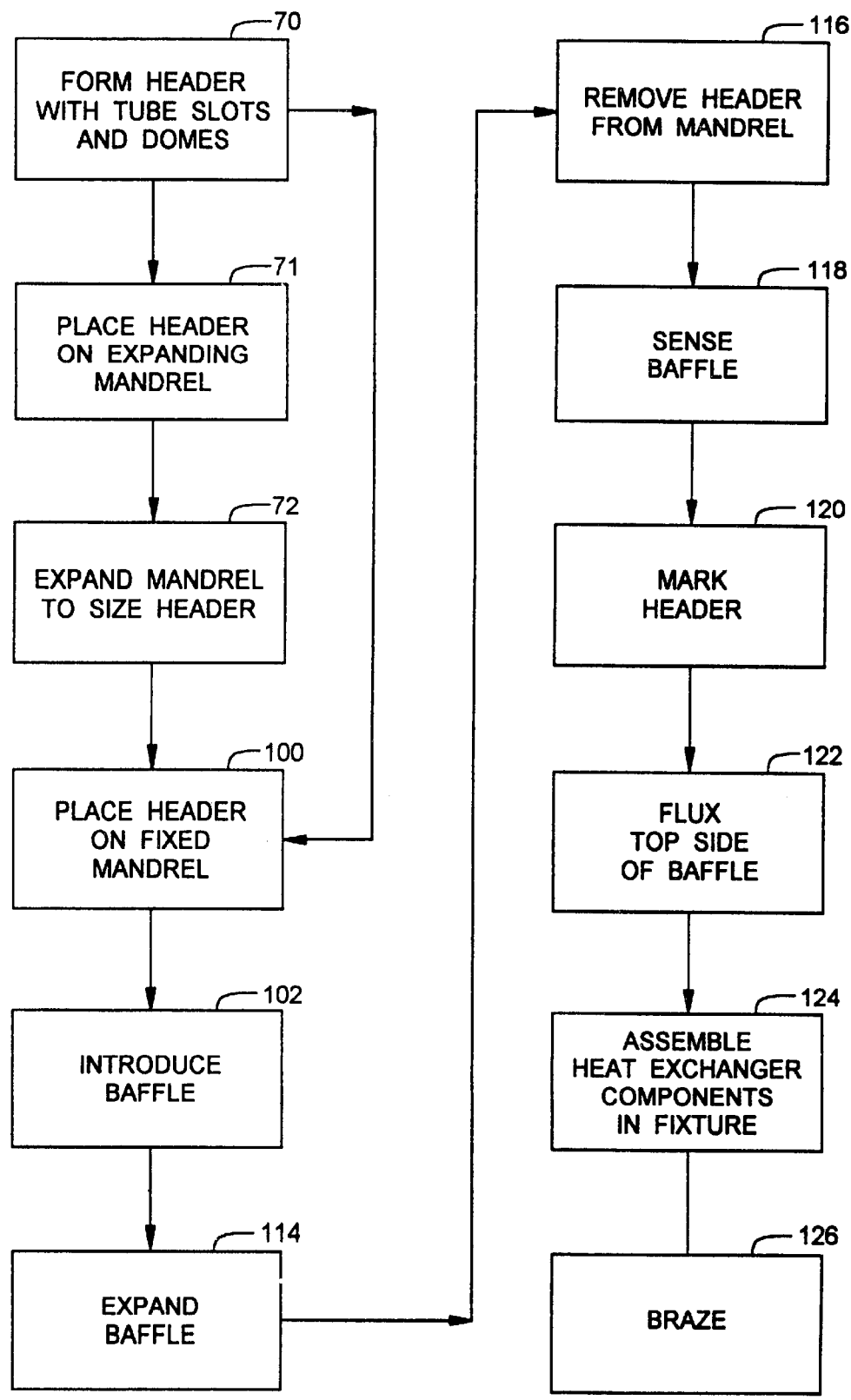
FIG. 5 is a block diagram of a method of manufacturing a heat exchanger, including a header with an internal baffle, according to the invention.

Turning now to FIG. 5, the steps in the method of manufacture of a heat exchanger are shown. A first step is the formation of a header with tube slots and domes and is shown at block 70. This step amounts to making the headers 10 and 12 as disclosed in the previously identified U.S. Pat. No. 4,615,385.

Figure 6:
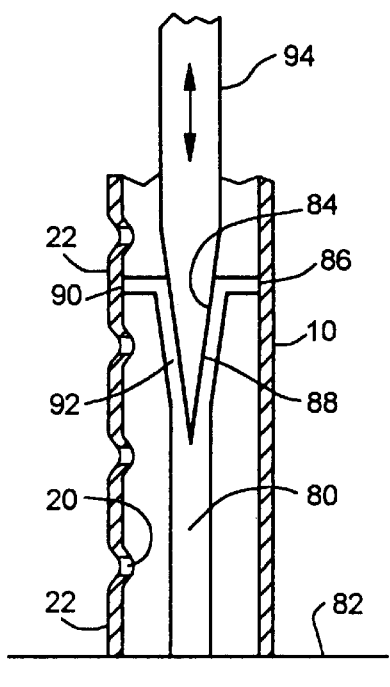
FIG. 6 is a fragmentary sectional view of an optional step performed in the method of the invention.

After the header is formed, it is optionally placed on an expanding mandrel as shown at block 71 and the mandrel expanded to size the header as shown at block 72. The steps shown at block 71 and 72 are optional and depend upon the ability to hold tolerances in formation of the header. The manner in which the step shown at block 71 and 72 is accomplished is illustrated in FIG. 6. As seen, a mandrel 80 is located on a stop surface 82. A formed header such as the header 10 is located over the mandrel 80.

At its upper end, the mandrel 80 has a split shown at 84 and is formed of relatively resilient material. A generally circular bead 86 is formed on one leg 88 of the split mandrel while a similar bead 90 is formed on the other leg 92 of the split mandrel 80. The beads have nominally the same radius as the inside diameter of the header 10 but when the same come together, they are sufficiently close to one another so that they may readily pass into the header 10 in spite of the presence of the relatively smaller cross-sectional sections 44 (FIG. 2).

The length of the mandrel 80 in relation to the stop surface 82 is such that the beads 86 and 90 will be positioned at the center point of a selected dome 22 where the baffle is to eventually be located. A wedge-like element 94 is moved from the opposite end of the header 10 between the legs 88 and 92 of the split mandrel 80 to drive the beads 86 and 90 into engagement with the dome 22 and the opposite part of the wall of the header 10. The resulting sizing of the interior of the selected dome 22 is dependent upon the degree of incursion of the wedge-like element 94 into the mandrel 80 which, in turn, is chosen to obtain the desired, cross-sectional shape at the location, which cross-sectional shape is made uniform from one header 10 to the next as a result of the sizing operation.

Figure 7:
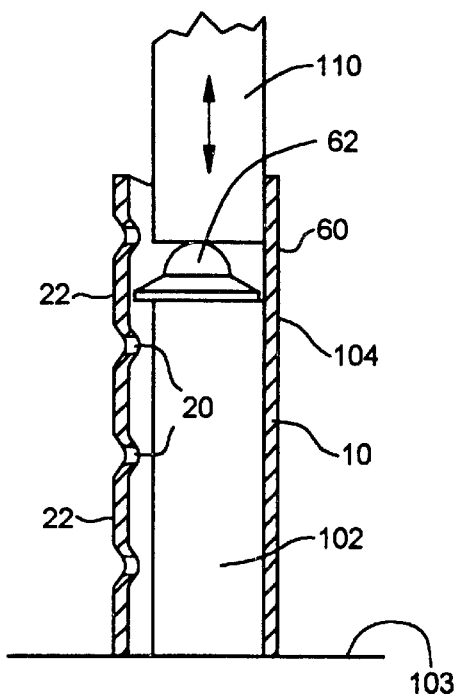
FIG. 7 is a view similar to FIG. 6 but illustrating another step in the performance of the invention.

It will of course be appreciated that if tolerances can be held during the manufacture of the headers 10, then there is no need to perform the steps shown at block 70 and 72 in FIG. 5. In such a case, the method may proceed directly to a block 100 which represents the step of placing the header 10 on a fixed mandrel or spindle 102 against step surface 103. As shown in FIG. 7, the fixed mandrel 102 has an upper surface 104 that is located 0.031" (half the thickness of the sheet of which the preform 60 is made) below the mid-point of the selected dome 22 in relation to the stop surface 103. This distance is chosen for an aluminum sheet thickness of 0.062" that is used in making the preform 60 as mentioned previously.

The preform 60 may be introduced sidewise into the header and then turned to be transverse to the direction of elongation of the header 10, resting upon the upper surface 104 with the dome 62 uppermost.

This step is shown at block 102 in FIG. 5 and the resulting orientation of the components is apparent in FIG. 7.

The baffle is then expanded by compressing the same towards a planar configuration. That is to say, the preform 60 is collapsed and this is accomplished through the application of a compressive force by a movable spindle or mandrel 110 which is moved downwardly within the header 10 into engagement with the dome 62. Once this step is finished, the preform 60 will appear as the baffle 46 shown in FIG. 2.

Figure 8:
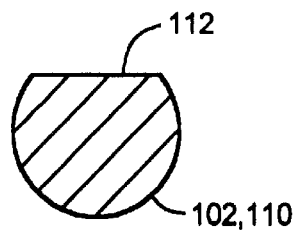
FIG. 8 illustrates the cross section of a spindle used in performing the step illustrated in FIG. 7.

To facilitate the compressive process, the spindles and/or mandrels 102, 110 are generally cylindrical, having a shape that is closely approximate to the inner peripheral configuration of the header 10 or 12. The same is also provided with a flat 112 (FIG. 8) on one surface thereof so as to allow for clearance at the relatively smaller cross-sections adjacent the tube slots 20.

The step of expanding the baffle is shown in FIG. 5 at the block 114 and following the performance of that step, the header 10 is removed from the mandrel as shown at a block 116.

The header 10 is then moved to a sensing station where a determination is made as to whether the baffle is in fact in place. This is shown at a block 118 and can simply be as simple as placing a light source at one end of the header 10 and a photosensitive device at the opposite end.

Assuming that the presence of a baffle has been sensed at the step represented by the block 118, an identifying mark is placed on the header as shown at step 120 to facilitate subsequent inspection. Following the marking of the header, brazing flux, such as a potassium fluoaluminate flux used in the so-called Nocolok™ brazing process, is introduced to the side of the baffle 46 that originally was the dome side. This is shown at a block 122.

The components are then assembled to the configuration generally illustrated in FIG. 1 and held in place by a suitable fixture as is well known. This is represented by the block 124. The fixture is then placed in a brazing furnace and the components brazed together as shown by a block 126.

The resulting assembly may then be tested, packaged and shipped.

From the foregoing, it will be appreciated that the method of the present invention does not involve weakening the headers as by slitting the same and does away with the cost of such a forming operation. Leaks associated with baffles introduced through slits are avoided and the relatively better sealing obtained through endwise insertion of baffles can be achieved, not withstanding the fact that the headers, in a preferred embodiment, are of the type having domes located between tube slots and therefore have an irregular interior. Of course, the method can be used with headers that have perfectly cylindrical interiors, i.e., without the domes 22, if desired.

What is claimed is:

1. A baffle perform for use in the manufacture of a heat exchanger with a baffled, tubular header and comprising:

a metallic slug formed of aluminum and braze clad on at least one side and having a convex and an opposite concave side, said slug being circular and having a generally semispherical dome of smaller diameter than the slug on one side thereof, and a radially outwardly directed skirt extending from the base of the dome to the periphery of the slug.

2. The baffle preform of claim 1 wherein said skirt is generally frustoconical.

3. The baffle preform of claim 2 wherein the minor base of said skirt merges into the base of said dome and said skirt also extends axially away from said dome.

4. The baffle preform of claim 3 wherein said slug is formed of aluminum sheet and is braze clad on both sides thereof.

* * * * *